US007590630B2

(12) United States Patent
Richter (10) Patent No.: US 7,590,630 B2
(45) Date of Patent: Sep. 15, 2009

(54) MANAGING ELECTRONIC INFORMATION

(75) Inventor: John D. Richter, Napoleon, OH (US)

(73) Assignee: Electronic Data System Corporation, Plano, TX (US)

( * ) Notice: Subject to any disclaimer, the term of this patent is extended or adjusted under 35 U.S.C. 154(b) by 553 days.

(21) Appl. No.: 10/736,001

(22) Filed: Dec. 15, 2003

(65) Prior Publication Data

US 2005/0131901 A1 Jun. 16, 2005

(51) Int. Cl.
*G06F 7/00* (2006.01)
*G06F 17/30* (2006.01)

(52) U.S. Cl. .................. 707/10; 707/2; 707/8

(58) Field of Classification Search ............. 709/204, 709/229, 219; 705/35; 707/4; 726/7; 713/201
See application file for complete search history.

(56) References Cited

U.S. PATENT DOCUMENTS

| | | | |
|---|---|---|---|
| 6,055,637 A * | 4/2000 | Hudson et al. .............. 726/20 |
| 6,182,142 B1 * | 1/2001 | Win et al. .................. 709/229 |
| 6,453,353 B1 * | 9/2002 | Win et al. .................. 709/229 |
| 6,523,027 B1 * | 2/2003 | Underwood ................. 707/4 |
| 6,665,664 B2 * | 12/2003 | Paulley et al. ................ 707/4 |
| 7,080,077 B2 * | 7/2006 | Ramamurthy et al. ......... 707/9 |
| 7,086,085 B1 * | 8/2006 | Brown et al. ................ 726/7 |
| 7,134,137 B2 * | 11/2006 | Joshi et al. ................. 726/1 |
| 2002/0091798 A1 * | 7/2002 | Joshi et al. ................ 709/219 |
| 2002/0156904 A1 * | 10/2002 | Gullotta et al. ............. 709/229 |
| 2003/0069818 A1 * | 4/2003 | Menninger ................. 705/35 |
| 2003/0182463 A1 * | 9/2003 | Valk ........................ 709/310 |
| 2003/0229812 A1 * | 12/2003 | Buchholz ................... 713/202 |
| 2003/0237044 A1 * | 12/2003 | Hayer et al. .............. 715/501.1 |
| 2005/0102358 A1 * | 5/2005 | Gold et al. ................. 709/204 |

OTHER PUBLICATIONS

Proactive DBA, "SQL Query Analyzer Performance & Tuning", www.whitesands.com, Dec. 6, 2003.*

SYBASE, System Administration Guide, vol. 1, Adaptive Server Enterprise 12.5, Table of Contents and Chapters 9, 10, and 11, May 2001.

White Sands Technology, Inc., ProActive DBA, http://www.proactivedba.com/Home/home.htm, pp. 1-2.

White Sands Technology, Inc., ProActive DBA, Diagnostic Monitor, Performance & Tuning, pp. 1-4, Copyright 2003.

White Sands Technology, Inc., ProActive DBA, SQL Query Analyzer, Performance & Tuning, pp. 1-4, Copyright 2003.

(Continued)

*Primary Examiner*—John E Breene
*Assistant Examiner*—Giovanna Colan
(74) *Attorney, Agent, or Firm*—Fish & Richardson P.C.

(57) ABSTRACT

Electronic information management includes techniques for developing and applying database security. In certain implementations, database access statements issued for applications in use are analyzed. Analyzing issued database access statements may include capturing the database access statements, normalizing the database access statements, and eliminating redundancies from the database access statements. A standardized set of issued database access statements may result from the analysis procedure. From the analyzed database access statements, the items accessed and types of access may be determined for an application, and a set of permissions may be determined from the determined items accessed and types of access for the application. A role associated with the application may be developed based on the permissions for the application. The role may be used to allow a user database access when associated with the application.

23 Claims, 4 Drawing Sheets

OTHER PUBLICATIONS

White Sands Technology, Inc., ProActive DBA, Automated Maintenance Edition, Performance Tuning and Maintenance for Sybase and Microsoft SQL Server, pp. 1-2, Copyright 1996-2000.

White Sands Technology, Inc., ProActive DBA, Disaster Recovery Toolset, Advanced Data Corruption Detection, Recovery and Repair for Sybase ASE, pp. 1-2, Copyright 2003.

* cited by examiner

MANAGING ELECTRONIC INFORMATION

TECHNICAL FIELD

This description relates to computer systems, and more particularly, to managing electronic information.

BACKGROUND

Information is a strategic resource for an organization; a significant amount of money and time are spent acquiring and managing information. Among the more important information of a typical organization is its marketing, sales, customer, engineering, and human resources data. To assist in accessing and manipulating its information, an organization typically stores the information in electronic databases.

Because the information in databases is often quite important to an organization, it may be beneficial to ensure that people only access the databases in a controlled manner. By establishing controls, often referred to as security, inadvertent and/or surreptitious modification of an organization's information may be avoided, or at least diminished. Furthermore, controls help to ensure the confidentiality, accuracy, and availability of information.

Conventional database security techniques include assignment of permissions to access database tables and/or database procedures to individual users or groups of users. Assignment of permissions may come from a list of the permissions, and permissions may be grouped to form "roles" that may be assigned to various users. However, the list of permissions may be time-consuming to create and maintain, as it must be updated to reflect changes in user requirements. When a user's responsibilities or requirements change, the permissions assigned to the user need to change as well. As a result, umbrella permissions are often granted to give access to a large number of database tables and database procedures, because changing a user's permissions each time is time-consuming. But umbrella permissions may grant a user unnecessary access to data in a database, compromising the security of that database.

Conventional methods of assigning permissions also include analyzing application code for all database access and developing a list of permissions for access of the application. A role may be created to which the developed list of permissions is assigned, and the role may be assigned to various users.

SUMMARY

Techniques are provided for managing electronic information. In one general aspect, database access statements issued for an application in use are analyzed. The database access statements may be, for example, Structured Query Language (SQL) queries. Based on the issued database access statements for the application, accessed items and types of access for the application are determined. A role associated with the application is developed based on the determined accessed items and types of access. The role may be used to allow a user database access when associated with the application. The process may be performed by hand, by machine, possibly under the control of instructions stored on a machine-readable medium, or by any other appropriate technique.

Particular implementations may include one or more of the following features. For example, the issued database access statements may be analyzed by capturing the database access statements, normalizing the captured database access statements, and eliminating redundancies from the normalized database access statements. As another example, the determined accessed items and types of access may include objects accessed and operations performed on the objects. As a further example, a role may be developed by determining permissions for the application based on the determined accessed items and types of access for the application. As an additional example, which of a set of users are authorized to use the application may be determined.

Some implementations may include detecting a user request to establish an application session. Detecting a user request to establish an application session may include, for example, determining if a user is authorized to use the application. The implementations also may include finding the role associated with the application and assigning the role to a user. The implementations additionally may include detecting an end of the application session, and, if an end of the application session is detected, disabling the assigned role for the user.

In another general aspect, database access statements (e.g. SQL queries) issued for one or more applications in use are captured. The captured database access statements are normalized, and redundancies are eliminated from the normalized database access statements.

Based on the issued database access statements, the accessed items and types of access are determined for an application. The determined accessed items and types of access may include objects accessed and operations performed on the objects.

Based on the accessed items and types of access, permissions are developed for each application. Based on the developed permissions, a role associated with each application is developed.

Furthermore, which of a set of users are authorized to use the application is determined. A user request to establish a session of the application is detected, and whether the user is authorized to use the application is determined.

If the user is authorized to use the application, the role associated with the application is found and assigned to the user. If an end of the application session is detected, the assigned user role is disabled.

The details of one or more implementations are set forth in the accompanying drawings and the description below. Other features of will be apparent from the description and drawings, and from the claims.

DESCRIPTION OF DRAWINGS

Like reference symbols in the various drawings indicate like elements.

DETAILED DESCRIPTION

Electronic information management may be accomplished by examining database access statements issued for an application in use. By analyzing the statements, the database access permissions for the application may be determined, and the determined permissions may be developed into a user role associated with the application. Database access may then be granted on an application-use basis. To grant the database access, for example, a user may be assigned a role when establishing a session of an application associated with the developed user role. Electronic information management may, however, be achieved by a variety of other techniques.

Figure 1:
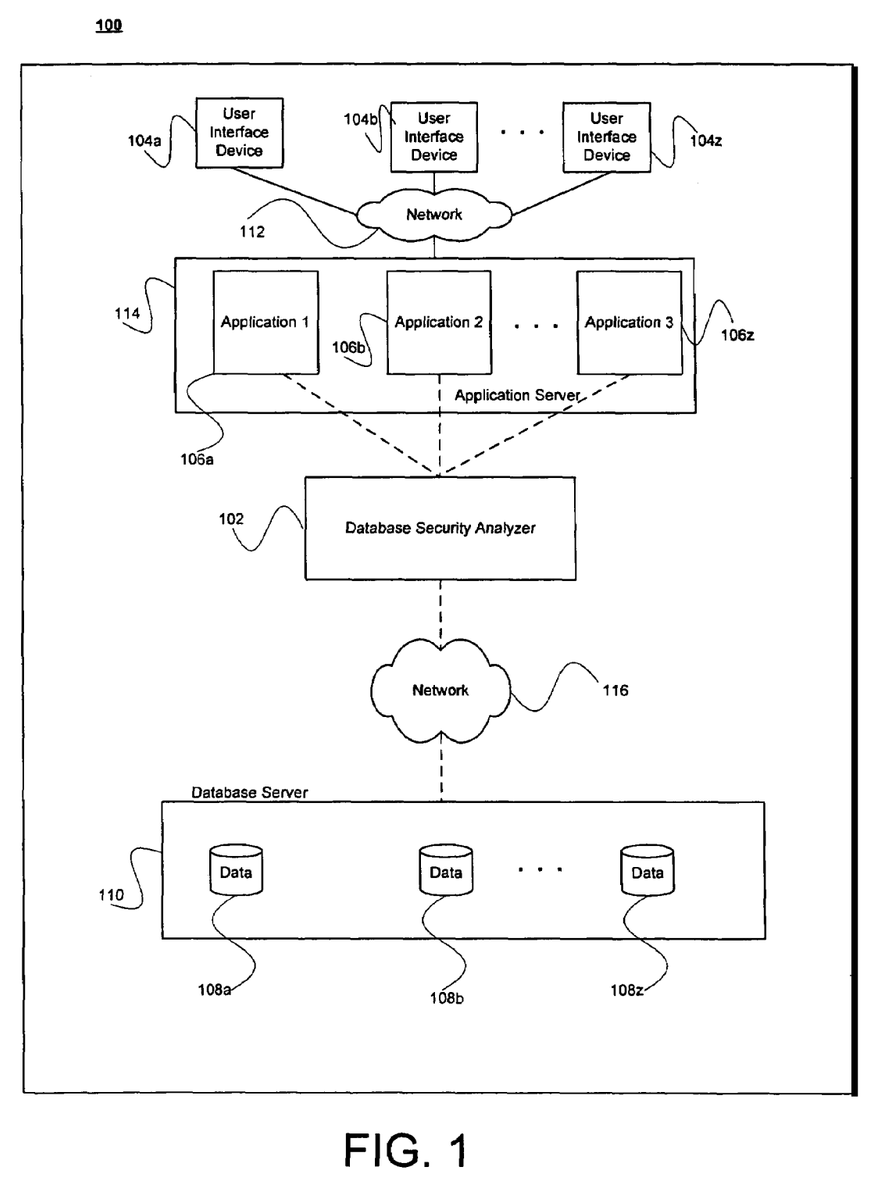
FIG. 1 is a block diagram that illustrates a system for managing electronic information.

FIG. 1 illustrates a system 100 for electronic information management. In general, a database security analyzer 102 captures and analyzes database access statements issued as a result of interactions between user interface devices 104a-104z, applications 106a-106z, and a database or collection of databases, such as, for example, databases 108a-108z. Using the captured statements, the database security analyzer 102 determines the accessed items and types of access required for each application. The system 100 generates permissions related to execution of each application based on the determined accessed items and types required for the application. These permissions may be used for controlling access to the databases on a per-application basis.

In more detail, the databases 108 may store any appropriate data and relations therebetween in an easily accessible manner. For example, databases 108 may store customer data, marketing data, sales data, and/or engineering data. Additionally, databases 108 may have a flat, hierarchical, relational, or any other appropriate association between data. In particular implementations, databases 108 are relational databases where relations between data, or "information items", are stored in tables. In relational databases, relations between the data may be stored as accessible attributes.

As illustrated, databases 108 are maintained on a database server 110. In general, a database server may be any appropriate device responsible for managing the data stored in a database. In other implementations, the databases may be distributed across multiple database servers or may reside on other types of servers. Moreover, any number of databases may be used.

As mentioned previously, the databases 108 may be accessed during the use of applications 106, which may be initiated and/or controlled through the user interface device(s) 104. If use of the application requires accessing a database, database access statements are issued.

User interface devices 104 may be any appropriate devices for receiving information from applications 106, presenting the information to a user, and receiving input from a user. Examples of a user interface device include a personal computer (PC), a personal digital assistant (PDA), a workstation (WS), and a cellular telephone.

The applications 106 may include word processing, spreadsheet, marketing, human resources, sales, accounting, and database applications. In general, an application is any association of logical statements that dictate the manipulation of data. As illustrated, the applications 106 are maintained on an application server 114. In general, an application server may be any appropriate device for handling application operations and connections. For example, the application server 114 may handle interactions between an application and the databases 108. In other implementations, however, the applications may be distributed across multiple application servers or reside on other types of servers. Moreover, any number of applications may be used.

The user interface device(s) 104 may access applications using a network 112. Additionally, the applications 106 may access databases 108 using a network 116. The network 112 and the network 116 may be one of a variety of established networks, such as, for example, the Internet, a Public Switched Telephone Network (PSTN), the world wide web (WWW), a wide-area network ("WAN"), a local-area network ("LAN"), or a wireless network.

The issued database access statements may be commands of any appropriate database manipulation language (DML).

In certain implementations, the DML commands may be based on various structured query language (SQL) standards. The database access statements may take the form of a SQL stream including data related to use of an application, such as, for example, data identifying an application, data related to the application's user, and data associated with the location of use, which may be used to associate the database access statements with applications 106. In certain implementations, a stream lacking the data related to use of an application, described above, may have to be modified such that this, or similar, data may be gathered.

The database security analyzer 102 detects the issued database access statements and analyzes them to determine the permissions required for each application. The database security analyzer may be a stand-alone device, a software application running on another device, or another processing system.

In one mode of operation, user interface device(s) 104 initiate the execution of applications 106 by issuing commands through the network 112. The user interface device(s) 104 and the applications 106 may interoperate with each other by entering into a client-server relationship, for example. In performing their operations, the applications issue access statements to databases 108 through the network 116. The access statements may indicate the data to be accessed and any operations to be performed on the data (e.g. retrieve, delete, insert, update, and merge). Databases 108 interpret the access statements and respond with the appropriate data.

The database security analyzer 102 obtains a copy of the issued database access statements and analyzes them to determine the data accessed and the operations performed on the data. To accomplish its analysis, the database security analyzer 102 may remove non-consequential information from the statements (i.e. normalize the statements). For example, the database security analyzer 102 may remove instructions to access a certain line of a table if database access is controlled on a table level. As another example, if there are two database access statements—e.g., SELECT NAME FROM ITEM WHERE ITEM='ABCD' and SELECT NAME FROM ITEM WHERE ITEM='JKLM'—normalizing may include removing the variable information from the statements. In addition, the database security analyzer 102 may remove any redundant statements, such as, for example, data retrievals from the same table if database access is controlled on a table level.

From the non-redundant statements, the database security analyzer 102 develops a set of permissions regarding the database access necessary for each application. In one implementation, the set of permissions may be generated by the database security analyzer. Alternatively, the set of permissions may be generated by a database server or a database management system. These permissions may be used to form a role that is associated with each application. The role will indicate the permissions for the application to interact with the databases 108 that the application needs to access.

To increase the probability that the database security analyzer 102 obtains issued database access statements for the full range of the applications' uses, the database security analyzer may be allowed to analyze issued database access statements without any supervision for a period of time in which all types of uses of the applications should be performed. For example, an accounting program that executes its functions on a monthly basis may be analyzed for a month, or more. However, if time is a concern, a directed script of actions may be built for an application user to perform, encompassing most standard tasks performed during application execution. The database security analyzer 102 may then analyze the actions of the directed script in a short period of time to form a role associated with the application.

In one implementation, once a role has been developed for and associated with an application, the role associated with the application is assigned to a user who wants to execute the application. The assignment may be made at or before the time of execution. Furthermore, the user may have to be authorized to use the application. Once the role is assigned to the authorized user, the user is enabled to access the appropriate databases associated with execution of the application. When the execution of the application is complete, the role is disabled, and the user is unable to access the databases using the role. Assignment and enforcement of a role may be performed by a database security analyzer, a database server, a database management system, and/or an application server.

The system 100 has a variety of features. For example, the system 100 does not require the time and cost associated with conventional methods of analyzing application code for all database access. In addition, utilizing the system 100, application users only have access to the databases and/or operations necessary for application execution, thereby preserving the security of remaining databases and/or parts of the accessed databases. Once a user exits an application, the user has no access to the data in the database. Also, no knowledge of databases is necessary to use the system 100 because the system 100 works at an application level.

Although FIG. 1 illustrates a system for managing electronic information, other implementations may include fewer, additional, and/or different arrangements of components. For example, the user interface devices 104 may communicate with the applications 106 via the network 116, and may interact with the databases 108 via the network 112. As another example, the network 112 and the network 116 may be one network. As a further example, the database security analyzer 102 may be placed on a common chokepoint of a network to capture and analyze issued database access statements. Alternate implementations may include locating the database security analyzer 102 on machines that house the user interface devices 104, the applications 106, or the databases 108, in order to capture and analyze the database access statements. The database security analyzer may, for example, be a part of or an add-on to the application server 114, the network 116, the database server 110. Additionally, the database security analyzer may be a part of or an add-on to a software application, such as, for example, a database management system, a database engine, or a server. A database management system, for example, is a collection of programs that enable modification and extraction of information from a database. Thus, the issued database access statements may be any appropriate data manipulation instructions, whether internal to or external to a database management system.

Figure 2:
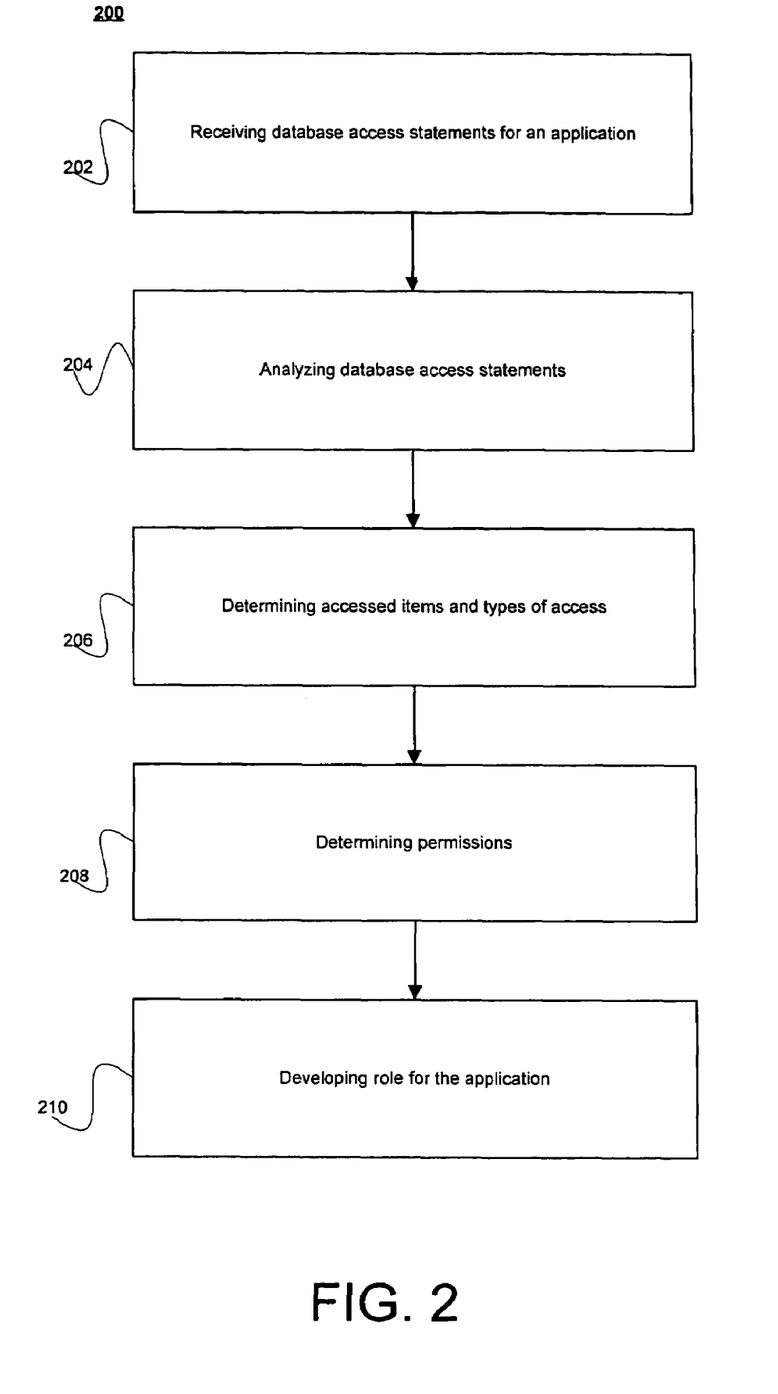
FIG. 2 is a flow chart illustrating a process for managing electronic information.

FIG. 2 is a flow chart illustrating a process 200 for electronic information management. Process 200 may, for example, describe the operations of the database security analyzer 102 of FIG. 1.

The process 200 begins with the receipt of database access statements issued in association with an application in use (operation 202). Receiving database access statements may be accomplished, for example, by actively capturing them from a stream or by having copies of database access statements made and forwarded. The database access statements may have been generated by a user interface device interacting with an application.

The received database access statements for the application may then be analyzed (operation 204). Analyzing the database access statements may include normalizing and eliminating redundancies from the database access statements. Normalizing, as described earlier, may include reducing the gathered database access statements to a standard set by removing variable names in the database access statements. Eliminating redundant access statements may be accomplished, for example, by recognizing that access statements that access the same data in a database in the same way are redundant.

The database access statements are further processed to determine which database items were accessed and what types of access were used (operation 206). The types of database access may include inserting items, reading items, updating items, merging items, and deleting items from a database.

The determined accessed items and the determined access types are used to determine a list of permissions associated with the application (operation 208). The list of permissions allow the application to access the appropriate databases for application execution. Access to databases may include the ability to manipulate data stored in databases, such as, for example, inserting items, reading items, updating items, and deleting items from a database, as described earlier.

A role for the application is then developed (operation 210). The list of permissions may be used to create permissions assignments for the role associated with the application. When a user, who may have to be authorized, uses the application, the user is assigned the role associated with the application, which provides the user access to the databases associated with the execution of the application. Without using the application, and, therefore, without using the role, the user may not have access to the databases associated with the execution of the application.

Although FIG. 2 illustrates one implementation of a process for managing electronic information, other implementations may include fewer, additional, and/or a different arrangement of operations. For example, an entity independent of a database security analyzer 102 may be used to perform all or a portion of the receipt and processing of the database access statements. Processing of the issued database access statements by the independent entity may include normalizing and eliminating redundancies from the issued database access statements, as described earlier. The database access statements processed by the independent entity may be analyzed by the database security analyzer 102 to determine the items accessed and the types of access, as described earlier. The process for managing electronic information may include a check of whether database access statements have been received for a period of time having a duration sufficient to ensure that application uses of interest of have been performed. The role may be enforced by a database server, an application server, and/or a database management system.

Figure 3:
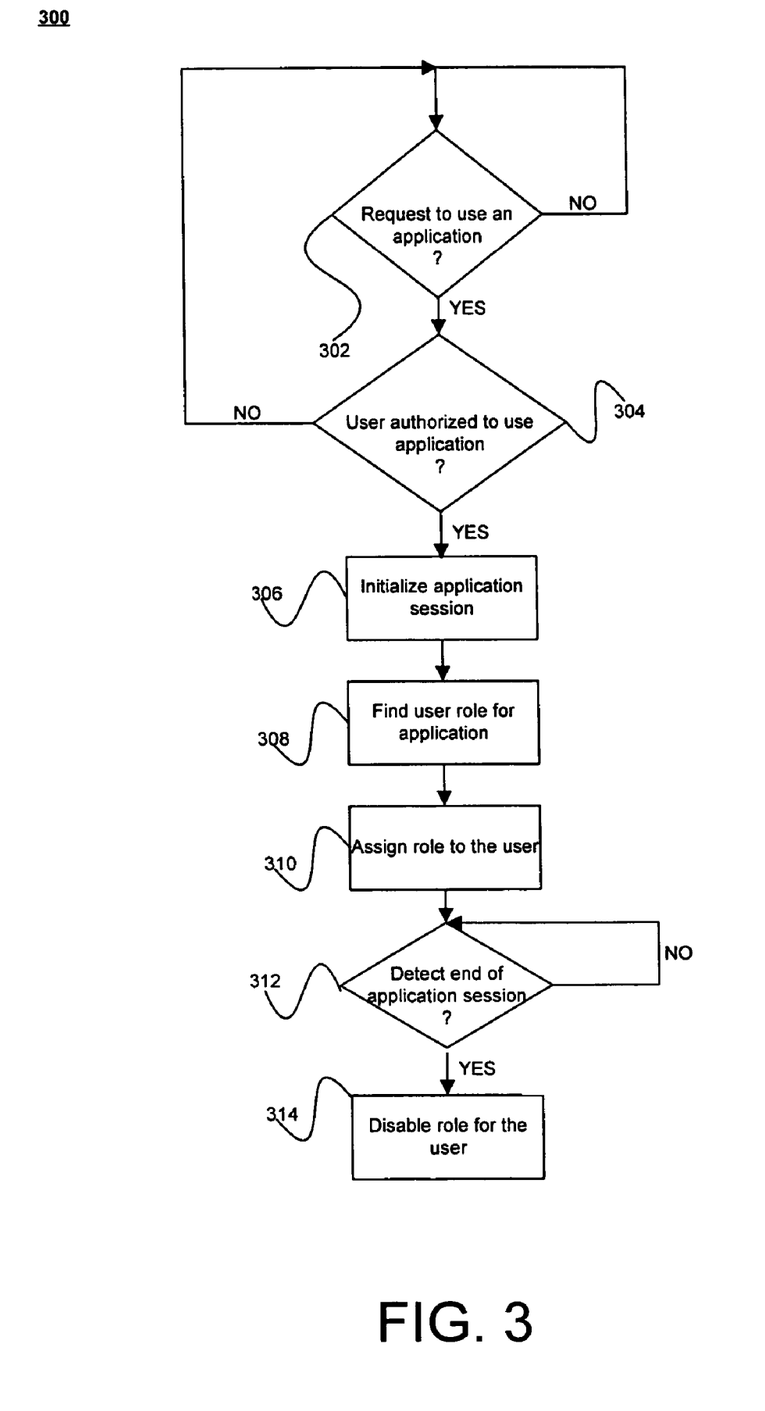
FIG. 3 is a flowchart illustrating a process for managing electronic information.

FIG. 3 is a flow chart illustrating a process 300 for managing electronic information. The process 300 may be implemented for a system similar to the system 100 in FIG. 1. The process 300 may, for example, describe the operations of a database server 110 of FIG. 1.

The process 300 begins with checking for a request to use an application (operation 302). A request to use an application may, for example, include a user attempting to establish an application session. In addition, a request may come from a user utilizing a user interface device to execute the application. The user may, for example, be an organization employee attempting to use the application to complete an assignment.

When a request is received, a determination is made as to whether the request is authorized (operation 304). The request may be authorized if, for example, the associated user is authorized. User authorization may include authentication through a password and/or searching an organizational database to determine if the user is authorized to utilize the application. An organizational database may store information related to a user, including user identification (ID), password, job title, user group to which the user belongs, and/or job responsibilities. A user also may be associated in the organizational database with the applications utilized to perform the user's organizational responsibilities.

If the request is authorized, a session of the application may be initialized (operation 306), and a user role associated with the application may be found (operation 308). The user role associated with the application may be stored in an organizational database, as described earlier. The user role may be based on database access statements issued for an application in use.

The found user role is assigned to the authorized user (operation 310). The assigned user role enables the user to access databases for running the application. If the user is not executing the application, then the user has no access to the role associated with application execution, and, therefore, has no access to the databases associated with application execution.

The process also calls for waiting to detect the end of the application session (operation 312). The application session may end, for example, when the user finishes using the application. The end of the application session may be signaled by the user closing the application.

Detection of the end of the application session leads to the disabling of the assigned user role for the user (operation 314). Disabling the user role results in the user no longer being able to access the data using the assigned user role for running the application.

Although FIG. 3 illustrates one implementation of a process for managing electronic information, other implementations may include fewer, additional, and/or a different arrangement of operations. For example, initializing the application session and finding the user role may be performed simultaneously. As another example, determining whether a user is authorized to use an application may not be performed, or may be performed by a different process. As a further example, a role may not need to be assigned to a user.

Figure 4:
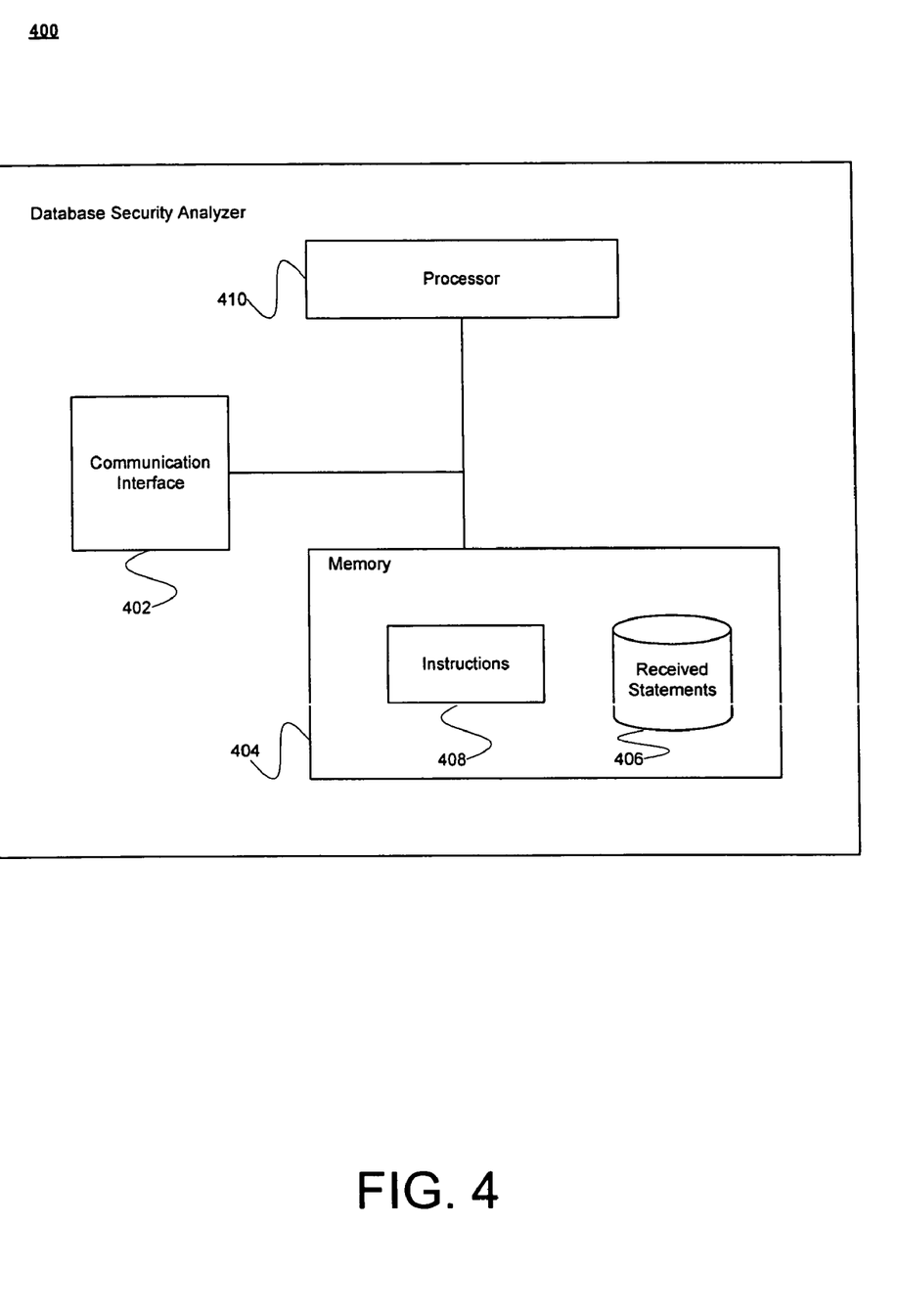
FIG. 4 is a block diagram of a database security analyzer.

FIG. 4 is a block diagram of a database security analyzer 400. The database security analyzer 400 may be one implementation of the database security analyzer 102 shown in FIG. 1. As described earlier, a database security analyzer analyzes database access statements issued by an executing application.

The database security analyzer 400 includes a communication interface 402. In general, a communication interface is any device for sending information to and/or receiving information from a communication network. The communication interface 402 may be an Ethernet card, a peripheral component interconnect (PCI) card, or a modem that enables connection to a communication network, such as, for example, the internet, a PSTN, a WAN, and/or a LAN. The communication interface 402 may receive database access statements issued as a result of application execution.

The database security analyzer 400 also includes memory 404. The received database access statements are stored in memory 404. In general, memory 404 may be any device appropriate for data storage at a location 408. The memory 404 may include random access memory (RAM), read-only memory (ROM), compact-disk read-only memory (CD-ROM), and/or registers. Memory 404 also includes instructions 408. In general, the instructions are a set of logical statements to perform a certain task or tasks.

The database security analyzer 400 additionally includes a processor 410. In general, a processor may be any device for manipulating information in a logical manner. The processor 410 may be a reduced instruction set computer (RISC) or a complex instruction set computer (CISC). The processor may direct information from one component of the database security analyzer 400 to another.

In one mode of operation, the database security analyzer 400 may be coupled to a network to analyze the issued database access statements resulting from application execution. Alternatively, the database security analyzer 400 may be placed on a server or a machine that houses a user interface device, an application, or a database to analyze the generated database access statements.

The issued database access statements are received at the communication interface 402. The database access statements may then be stored in the memory 404 and analyzed using the instructions 408 and the processor 410. Analyzing may include normalizing the database access statements and eliminating redundancies into a standardized set, as described earlier.

Alternate implementations may include the normalization and elimination of redundancies being performed by an apparatus independent of the database security analyzer 400. The independently standardized database access statements may then be received at the communication interface 402 and further processed as described below.

The standardized set of database access statements are analyzed by the database security analyzer 400 to determine the items accessed and the types of access for an application. Types of database access may include reading items, inserting items, updating items, merging, and deleting items from a databases. A list of permissions that enable specific database access are generated for an application based on the determined accessed items and types of access, and a role is developed from the permissions list for an application. The developed role and associated database access permissions may be utilized when the application is running.

Although FIG. 4 illustrates one implementation of a database security analyzer, other implementations may include fewer, additional, and/or a different arrangement of components. For example, the database security analyzer may include a display device, such as, for example, a screen, for displaying information. The database security analyzer may include a user input device, such as, for example, a keyboard or stylus, for enabling the user to input information. Alternatively, some or all of the instructions may be encoded on the processor.

A variety of implementations have been described in detail, and a number of other implementations have been mentioned or suggested. Furthermore, a variety of additions, deletions, modifications, and/or substitutions may be made while still achieving electronic information management. For these reasons, other implementations are within the scope of the following claims.

What is claimed is:

1. A method implemented by a computer, the method comprising:

analyzing a plurality of database access statements stored in a computer memory that were issued for an application during the application's use to determine previous accessed items and types of access for the application; and developing a role for the application based on the previous accessed items and types of access for the application, wherein when the application is in use by a user, the developed role for the application allows the user database access.

2. The method of claim 1 wherein analyzing the issued database access statements comprises:
capturing the plurality of database access statements;
normalizing the captured database access statements; and
eliminating redundancies in the normalized database access statements.

3. The method of claim 2 wherein the database access statements comprise Structured Query Language (SQL) queries.

4. The method of claim 1 wherein the previous accessed items and types of access include objects accessed and operations performed on the objects.

5. The method of claim 1 wherein developing a role comprises determining permissions for the application based on the previous accessed items and types of access.

6. The method of claim 1 further comprising determining which of a set of users are authorized to use the application.

7. The method of claim 1 further comprising:
detecting a user request to establish an application session;
finding the role for the application; and
assigning the role to a user.

8. The method of claim 7 wherein detecting a user request to establish an application session comprises determining if a user is authorized to use the application.

9. The method of claim 7 further comprising:
detecting an end of the application session; and
if an end of the application session is detected, disabling the assigned role for the user.

10. An article of manufacture comprising:
a machine-readable storage medium storing instructions configured to cause one or more machines to perform operations comprising:
analyzing a plurality of database access statements that were issued for an application during the application's use to determine previous accessed items and types of access for the application; and
developing a role for the application based on the previous accessed items and types of access for the application, wherein when the application is in use by a user, the developed role for the application allows the user database access.

11. The article of claim 10, wherein analyzing the issued database access statements comprises:
determining whether the plurality of database access statements have been captured;
normalizing the captured database access statements; and
eliminating redundancies in the normalized database access statements.

12. The article of claim 10 wherein the previous accessed items and types of access include objects accessed and operations performed on the objects.

13. The article of claim 10 wherein developing a role comprises determining permissions for the application based on the previous accessed items and types of access.

14. The article of claim 10 wherein the instructions are further configured to cause one or more machines to perform operations comprising determining which of a set of users are authorized to use the application.

15. The article of claim 10 wherein the instructions are further configured to cause one or more machines to perform operations comprising:

determining whether a user request to establish an application session has been detected; finding the role for the application; and
assigning the role to a user.

16. The article of claim 15 wherein determining whether a user request to establish an application session has been detected comprises determining if a user is authorized to use the application.

17. The article of claim 15 wherein the instructions are further configured to cause one or more machines to perform operations comprising:
detecting an end of the application session; and if an end of the application session is detected, disabling the assigned role for the user.

18. A database security analyzer comprising:
a communication interface configured to receive a plurality of database access statements that were issued for an application during the application's use;
a memory configured to store the issued database access statements; and
a processor configured to develop a role for the application based on the previously issued database access statements for the application, wherein when the application is in use by a user, the developed role for the application allows a user database access.

19. The analyzer of claim 18 wherein developing a role comprises:
analyzing the database access statements to determine previous accessed items and types of access for the application;
determining permissions for the application based on the previous accessed items and types of access for the application; and
developing a role associated with the application based on the determined permissions.

20. The analyzer of claim 19 wherein the previous accessed items and types of access include objects accessed and operations performed on the objects.

21. The analyzer of claim 18 wherein developing a role comprises:
determining whether the received database access statements have been captured;
normalizing the captured database access statements; and
eliminating redundancies in the normalized database access statements.

22. The analyzer of claim 18 wherein the memory comprises instructions, and the processor operates according to the instructions.

23. A method implemented by a computer comprising:
capturing a plurality of database access statements that were issued for one or more applications during the application's use, wherein the database access statements comprise Structured Query Language (SQL) queries;
normalizing the captured database access statements;
eliminating redundancies in the normalized database access statements;
analyzing the normalized database access statements stored in a computer memory to determine previous accessed items and types of access for an application, wherein the previous accessed items and types of access include objects accessed and operations performed on the objects;
determining permissions for the application based on the previous accessed items and types of access for the application;

developing a role for the application based on the determined permissions;

determining which of a set of users are authorized to use the application;

detecting a user request to establish a session of the application;

determining if the user is authorized to use the application;

if the user is authorized to use the application, finding the role for the application;

assigning the role to the user;

detecting an end of the application session; and if an end of the application session is detected, disabling the assigned role for the user.

* * * * *